United States Patent [19]  [11] Patent Number: 4,646,320
Krishnan  [45] Date of Patent: Feb. 24, 1987

[54] AUTOMATIC DIGITAL STRAPPING APPARATUS FOR DATA MODEMS

[75] Inventor: Vedavalli G. Krishnan, Miami Lakes, Fla.

[73] Assignee: Racal Data Communications Inc., Fort Lauderdale, Fla.

[21] Appl. No.: 744,891

[22] Filed: Jun. 14, 1985

Related U.S. Application Data

[63] Continuation of Ser. No. 363,202, Mar. 29, 1982, abandoned.

[51] Int. Cl.⁴ .............................................. G06F 13/00
[52] U.S. Cl. .................................... 375/8; 375/10; 375/121; 364/900
[58] Field of Search ... 364/200 MS File, 900 MS File; 375/8, 10, 12

[56] References Cited

U.S. PATENT DOCUMENTS

| | | | |
|---|---|---|---|
| 3,806,882 | 4/1974 | Clarke | 364/200 |
| 4,055,808 | 10/1977 | Holsinger et al. | 375/8 |
| 4,085,449 | 4/1978 | Walsh et al. | 375/8 |
| 4,125,871 | 11/1978 | Martin | 364/900 |
| 4,137,564 | 1/1979 | Spencer | 364/200 |
| 4,174,536 | 11/1979 | Misunas | 364/200 |
| 4,185,281 | 1/1980 | Silverstone | 340/711 X |
| 4,263,670 | 4/1981 | Sherman | 364/900 X |
| 4,403,303 | 9/1983 | Howes et al. | 364/900 |
| 4,425,664 | 1/1984 | Sherman et al. | 364/200 X |
| 4,455,661 | 6/1984 | Quereshi | 364/200 X |
| 4,514,825 | 4/1985 | Nordling | 364/900 |

Primary Examiner—James D. Thomas
Assistant Examiner—David L. Clark
Attorney, Agent, or Firm—Jerry A. Miller

[57] ABSTRACT

Apparatus employing microprocessor control for reconfiguring the strapping status of local and remote data modems automatically through a front panel display built into the modem.

2 Claims, 5 Drawing Figures

AUTOMATIC DIGITAL STRAPPING APPARATUS FOR DATA MODEMS

This is a continuation, of application Ser. No. 363,202, filed Mar. 29, 1982 now abandoned.

BACKGROUND AND SUMMARY OF THE INVENTION

The present invention relates to data communications, and more particularly to apparatus for configuring data communication networks including data modems.

In the past it has been common to manually strap a modem into a particular mode of operation or configuration. Strap-variable modem parameters include speed, multiport, half or full duplex, point-to-point or multipoint, central or remote modem, etc. Strap settings may also select a dynamic port allocation mode of operation or "dynaport." One example of dynaport operation is illustrated in U.S. Pat. No. 4,270,202 to Studdard et al., assigned to the assignee of the present application.

Increasing complexity of modem design has resulted in an increase in the number and complexity of straps to be set during manufacture and by the installer and/or operator to satisfy various modem user demands for differing configurations and uses of the modems. Further, it has often been necessary to deenergize the modem to complete strapping, thus resulting in lost data transmission time. In the past it has been possible to make very limited changes in the modem configuration, which are akin to strapping changes, by use of switches operated by, e.g., pushbuttons on the modem front panel to change modem speed in bits per second. Such switches are hard wired to the appropriate part of the modem's internal circuitry to effect a desired change.

In the past, it has been common to arrange modems in a network with a network controller. One such network is illustrated by U.S. Pat. No. 4,385,384, assigned to the assignee of the present application, entitled Modem Diagnostic and Control System, of Arthur H. Rosbury, et al., the disclosure of which is hereby incorporated by reference.

Typical prior art network control systems monitor modem status and operating parameters and transmit that information to the network controller. Also, it has been common for the network controller to be able to poll the modems on the network and command transmission to the network controller of status and parameter information. The network controller also has been used to receive indications of modem failure on the network and to command performance by a modem of selected testing routines and transmission of the results thereof to the network controller. This has been done in the past over a telemetry link using a slow data rate of, e.g., 75 bps and, e.g., FSK data transmission on a portion of the transmission link which is not being used for transmission of high speed data between data terminals. Display at the network controller of the status and configuration of remote modems on the network has thus been possible, along with display of the results of the command testing routine performed by the remote modem.

It has been found that it is often desirable to have the ability for modems of the transmission link to inquire of the status and configuration of other modems on the link and to initiate testing at the other modem, without the intervention of the network controller, or to be apprised of malfunction conditions at a particular remote modem without such intervention. It has also been found that the art is in need of a means of reconfiguring a modem without removing power to the modem and without interrupting data transmission. It is also desirable to be able to reconfigure and restrap remote modems on the same data link from a local site.

The present invention thus relates to a modem, e.g., contained in a data link which has input means on the external portion of the modem chassis, e.g., the front panel, and an accompanying display means. The input means and display means are coupled to a microprocessor or other suitable LSI circuit data processor having a stored memory. The memory may include electrically alterable nonvolatile programmable ROM, e.g., an ER 1400 made by General Instruments, or, alternatively, such an EAROM and a fixed ROM. The microprocessor or other suitable LSI circuit data processor can also be coupled to an external source of control signal input, e.g., a centrally located network controller, another modem on the data transmission link, or data terminal equipment (DTE) on the data link.

It is a feature of the present invention that strapping is implemented by use of a microprocessor contained within the modem and associated memory. The strapping microprocessor in conjunction with other microprocessors or LSI circuits within the modem establishes the configuration of the modem. The strapping microprocessor is operator-accessible at the site of the modem through an input and display section on, e.g., the front panel of the modem. By use of the front panel the operator can command display of the current strapping configuration, command implementation of certain preselected standard or user-designed strapping configurations, or make minor changes to the preselected standard or user-designed configurations. All of this can be done, as well, at the time of manufacture or installation to quickly and accurately establish the strapping configuration best suited to a given customer's intended usage of the modem. In addition, strapping can be modified modem-to-modem with the present invention. Other testing and monitoring functions can also now be accomplished from the front panel and modem-to-modem, without the need of intervention of a network controller or a DTE, however, these latter may also be used to command and monitor testing and status reports, or for the implementation of remote modem strapping changes. Modems on the data link can thus be quickly and accurately reconfigured, without removal of power to the modems in question and with very little or no interruption of data transmission.

DETAILED DESCRIPTION OF THE INVENTION

Figure 1:
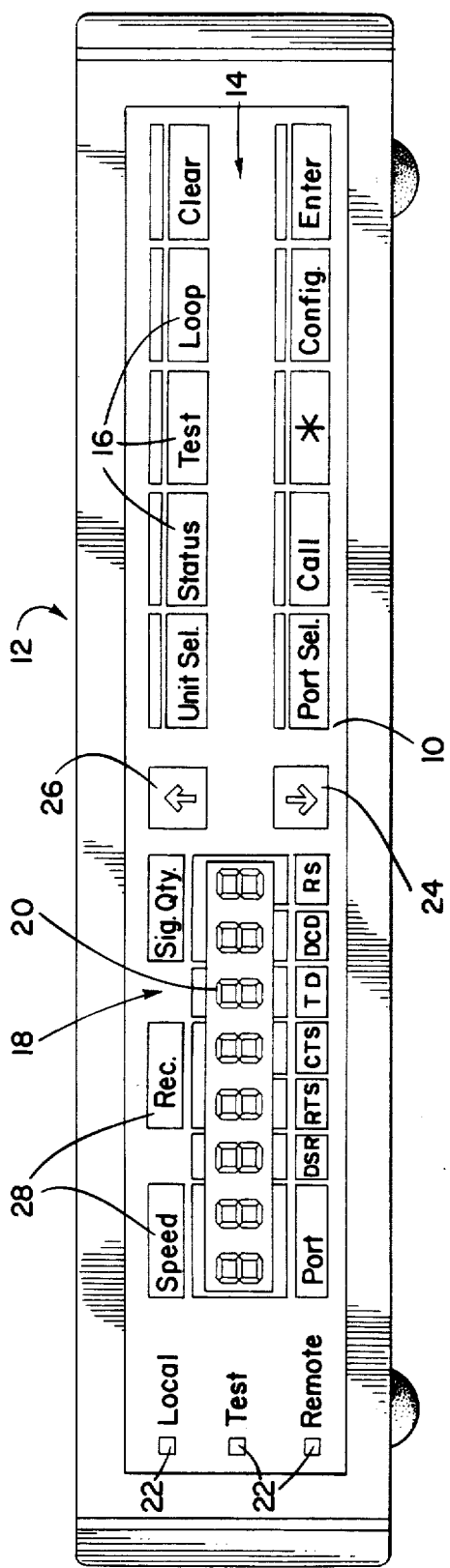
FIG. 1 shows the front panel of a modem according to the preferred embodiment with the input interface to the strapping microprocessor and a display panel.

Turning now to FIG. 1 there is shown a front panel 10 of a modem 12. The front panel 10 has a command section 14 having a plurality of command pushbuttons 16, and a display section 18, having a plurality of seven segment digital displays 20, which may be, e.g., LCD's or LED's. The front panel 10 also has in the display section local, test and remote indicator lights 22, a step-down control button 24 and a step-up control button 26. In addition, associated with the display panel 18 are labels 28 which indicate in certain instances the information being displayed on the display panel 18.

Figure 2:
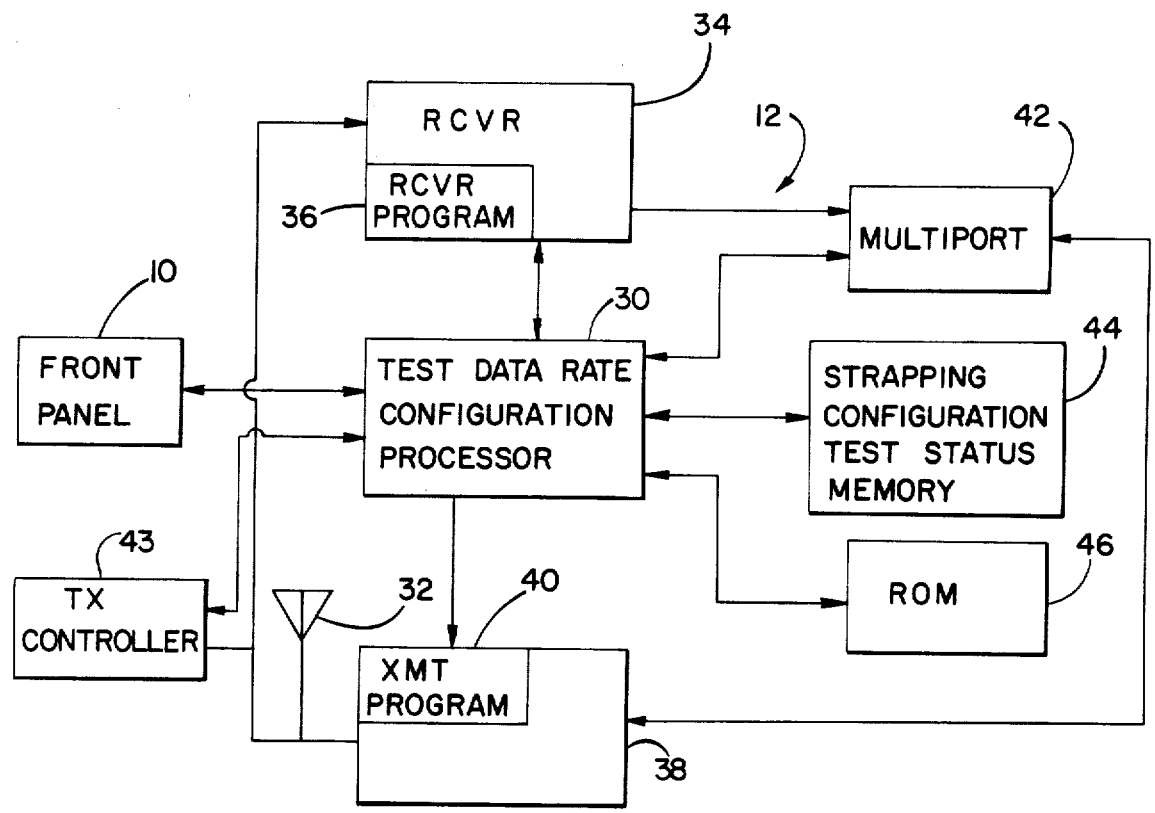
FIG. 2 shows a block diagram of a modem illustrating in a general manner certain functions of the preferred embodiment.

FIG. 2 shows the connection of the front panel 10 to a test, data rate and configuration microprocessor 30 within the modem 12. The modem 12 is of a type having software implemented reception and transmission of digital data over a transmission link 32. The modem 12 has a receiver section 34, which processes the incoming data according to a program in the Receive Program 36, to, e.g., demodulate, unscramble and decode it into the message which was sent by a remote modem or a DTE. The modem 12 also has a transmitter section 38 which processes the outgoing data to modulate, encode and scramble the data according to a transmit program 40. The modem 12 could also have a multiport capability controlled by a multiport section 42 for multiplexing the data transmitted or received through a plurality of ports in the modem 12.

The test, data rate and configuration microprocessor 30 ("also referred to as the option microprocessor") has associated therewith a memory 44 which may be, e.g., a nonvolatile read-write memory. In addition, a fixed read only memory 46 is connected to the option microprocessor 30. The option microprocessor 30 also includes random access memory (RAM) 64 shown as internal to the processor 30 in the embodiment under discussion (see FIG. 4). As hereinafter described, the ROM 46 provides permanent storage of standard strapping tables, the RAM 64 provides random access storage for the strapping tables, and the nonvolatile read-write memory 44 provides non-volatile storage for a user-designed strapping configuration.

Figure 3:
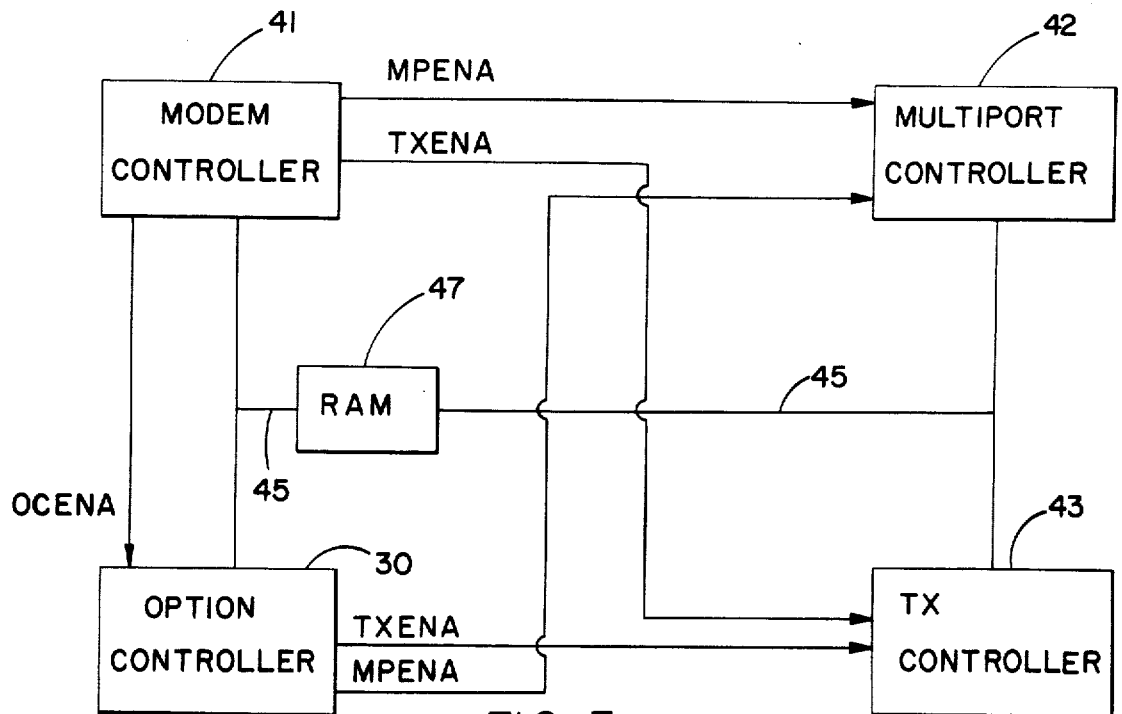
FIG. 3 shows a block diagram of the interconnection of various microprocessors within the modem according to the preferred embodiment.

The cooperation between the option microprocessor 30 and the other microprocessors in the exemplary modem 12 described herein is shown in further detail in FIG. 3. The modem 12 is shown to include a modem controller microprocessor 41, which in addition to the interconnections shown in FIG. 3, also operates to implement the transmitter and receiver programs 36, 40 to control the modulation and demodulation of transmissions within the modem. Also shown are the multiport microprocessor 42 and TX microprocessor 43. The TX microprocessor is used to conduct various monitoring routines in the modem and also to implement remote modem control functions, for example as shown in the above-noted application of Rosbury, et al. A common bus 45 connects these microprocessors 30, 41, 42 and 43 to a one byte (8 bit) RAM 47. Information is exchanged between these microprocessors 30, 41, 42 and 43 through the RAM 47. In addition, the modem controller microprocessor 41 provides an enabling signal OCENA to the option controller microprocessor 30 and both a multiport enable signal MPENA and a TX enable signal TXENA to, respectively, the multiport controller microprocessor 42 and the TX controller microprocessor 43. The option controller microprocessor 30 also provides a TX enable signal TXENA and a multiport enable signal MPENA to the multiport controller microprocessor 42 and to the TX controller microprocessor 43, to enable their access to the common bus 45.

At any one time only one microprocessor 30, 41, 42 or 43 is enabled to the common bus 45. The modem controller microprocessor 41 communicates with the multiport controller microprocessor 42 once each baud to, on the one hand, send receive data and, on the other hand, receive transmit data. It also communicates with the TX controller microprocessor 43 once each 32 bauds to receive an analog parameter command and send an analog parameter reply. The modem controller microprocessor 41 enables the option controller microprocessor 30 through OCENA for, e.g., 60 μs each baud, which gives the option controller microprocessor 30 control over common bus 45 to exchange strap information and/or status or test information with the microprocessors 41, 42 and/or 43 through the one-byte RAM 47.

The software protocol for transfers through the RAM 47 is based upon an 8-bit byte. A complete information exchange consists of, first, a command or request exchange between two microprocessors and, second, a data or reply exchange. For example, the option controller microprocessor 30 may send a request to the multiport controller microprocessor 42 through the RAM 47 to send the status of one of the ports, e.g., port A, of the multiport. This is followed by a request or command from the multiport controller microprocessor 42, if one is presently ready for communication to the option controller microprocessor 30, e.g., a request to read and send the present transmitter clock strap configuration as stored in the EAROM 44. These two requests are separated by a preselected time, e.g., 50 μs. After another preselected time delay, e.g., 8 bauds, the option controller microprocessor responds with the transmitter clock strapping status, having located this data in the appropriate EAROM 44 memory location, and the multiport controller microprocessor 42, e.g., 50 μs later sends the status of port A.

There are some exceptions to this protocol, e.g., data and analog parameter exchanges between the modem controller microprocessor 41 and the multiport controller microprocessor 42 or the TX controller microprocessor 43. For example, every baud the modem controller microprocessor 41 requests the transmit data from the multiport controller microprocessor 42 and, after a selected delay, e.g., 40 μs, the multiport controller microprocessor sends the transmit data to the modem controller microprocessor 41. Another example is that every baud the modem controller microprocessor 41 sends the receive data to the multiport controller microprocessor 42, there being no need for a reply from the multiport controller microprocessor 42. A final example is that the modem controller microprocessor 41, e.g., once very 32 bauds sends a request to the TX controller microprocessor 43 for the analog parameter commands and after a, e.g., 40 μs delay the TX controller microprocessor 43 sends the analog parameter command to the modem controller microprocessor 41. The modem controller microprocessor 41 can also send to the TX controller microprocessor 43 analog parameter data once every, e.g., 32 bauds, with no reply necessary.

The microprocessors 30, 41, 42 and 43 may communicate with each other with three different kinds of requests: a request to read, a request to write and special requests. In a read request, where one microprocessor 30, 41, 42 or 43 needs to obtain data from another, it sends a read request command in the form of a byte or bytes, having a preselected bit set, usually the most significant bit of the byte or bytes sent. In its reply slot, the other microprocessor 30, 41, 42 or 43 sends the data found in the memory location identified by the byte or bytes sent to it. Thus the one microprocessor 30, 41, 42 or 43 effectively reads a memory location in the other. Whenever a system status or configuration change occurs which must be conveyed immediately to one or more of the microprocessors 30, 41, 42 or 43 by another of the microprocessors 30, 41, 42 or 43, the other microprocessor 30, 41, 42 or 43 sends a write command with a preselected bit set indicating it is a write command. In this event, the one microprocessor 30, 41, 42 or 43 does not send a reply in its reply slot, as described above, but leaves that open to receive the data from the other microprocessor 30, 41, 42 or 43. Both such microprocessors 30, 41, 42 or 43 can, however, exchange write commands in the same request slot as explained above.

Special requests can be either of the read or write type, all handshake type exchanges falling in this category. Examples of special requests include sync request, no-request, continue and action request. Sync request is used to synchronize the modem controller microprocessor 41 and the option controller microprocessor 30. No-request is used when the microprocessor 30, 41, 42 or 43 to which a request command is sent has no pending request to send in its request slot as described above. Continue is used when more than one byte of information is needed by the microprocessor 30, 41, 42 or 43 receiving data during the previous reply slot, and effectively continues the previously sent request. Action requests are used, e.g., to start a series of processing within another of the microprocessors 30, 41, 42 or 43. The reply could either be a wait if the processing will take some time, or a special acknowledge which will allow delay in sending the reply, if reply is not immediately required. Special requests are answered by special replies, e.g., sync reply, no reply, wait reply, write acknowledge and special acknowledge. Sync reply acknowledges the sync request. No reply is used in conjunction with no request. Wait reply is used in case of a needed processing delay. Write acknowledge is sent to acknowledge a write request. Special acknowledges are used in conjunction with action requests.

Table 1 appended hereto shows the map for the option processor RAM 44 according to the present invention. As is common for RAM's, each memory location corresponding to the straps J1–J6 has a read command, e.g., 80 (in hexadecimal) and a write command, e.g., C0, both for J1 in Table 1, which determines whether it is intended to read what is present at that memory location or write into that memory location. Each memory location contains an 8-bit byte with binary digits D0–D7. D7 is maintained low in each instance with this being a means for checking memory locations later to ascertain if a byte has been changed.

All strap memory locations J1–J16 and certain other memory locations have both read and write commands. The first step J1 is a code indicating one of a number of standard strapping tables or a special strapping table for the modem as a whole, including multiport configurations and TX configurations (remote modem control and TX functions). Thus the binary digits D6–D4 correspond to modem tables stored in the ROM 46 which, if called for in binary digits D6–D4 in strap J1, will be loaded into the memory locations in the RAM 64 for straps J2–J5. By convention, if binary digits D6–D4 in strap J1 are all low, i.e., 000, then no preselected standard modem strap configuration from the ROM memory 46 is loaded in the RAM 44 positions corresponding to J2–J5. Instead the state of these memory locations is determined by a table which is entered into the EROM 44, which is customized to the particular user's desired configuration. Discounting the 000 code leaves seven other possible coded designations for the standard configuration tables through the use of binary digits D6–D4 in strap J1, i.e., 001, 010, 011 . . . 111. Each of these seven codes will correspond to a preselected standard strapping table having selected values for each of the binary digits D6–D0 for straps J2–J5, each of which tables is stored as four selected bytes in the ROM 46. By way of example the modem configuration tables corresponding to binary 1–7 could include (1) Point-to-Point with V27 and V54; (2) Point-to-Point with F.L., (3) Multiple Drop with F.L.-Central; (4) Multiple Drop with F.L.-Remote; (5) Multiple Drop with V27-Central; (6) Multiple Drop with V27-Remote; and (7) Multiple Drop with MPS 48-Remote. The option microprocessor 30 reads the respective bytes in the ROM 46 designated by strap J1, and loads them into the RAM 64.

Similarly, bits D2–D3 of strap J1 being 00 indicates that a special preselected customized multiport configuration is to be used which is stored in the EAROM 44. Discounting the code 00, leaves three possible coded indications of selected bytes in the ROM 46 to be loaded into memory locations in the RAM 64 corresponding to three standardized versions of strapping for straps J6–J12. Thus each of the codes 01, 10 and 11 are representations of a selected set of ROM 46 memory locations, each containing seven bytes of information corresponding to a preselected table of values for the binary digits D6–D0 for one of three possible preselected standard conditions for the straps J6–J12. In the same manner, bits D1–D0 if 00 will indicate selection of memory locations containing a customized table, and if not 00 will indicate where in the ROM memory 46 are stored the bytes corresponding to one of three possible tables of selected strap configurations for the remote modem controller/TX straps J13–J16.

The particular configurations listed are for a "Microzeta" modem made by the assignee of the present application, and except as explained herein are of no import to the present invention. They are given by way of example of an application of the present invention to an operating modem.

Figure 4:
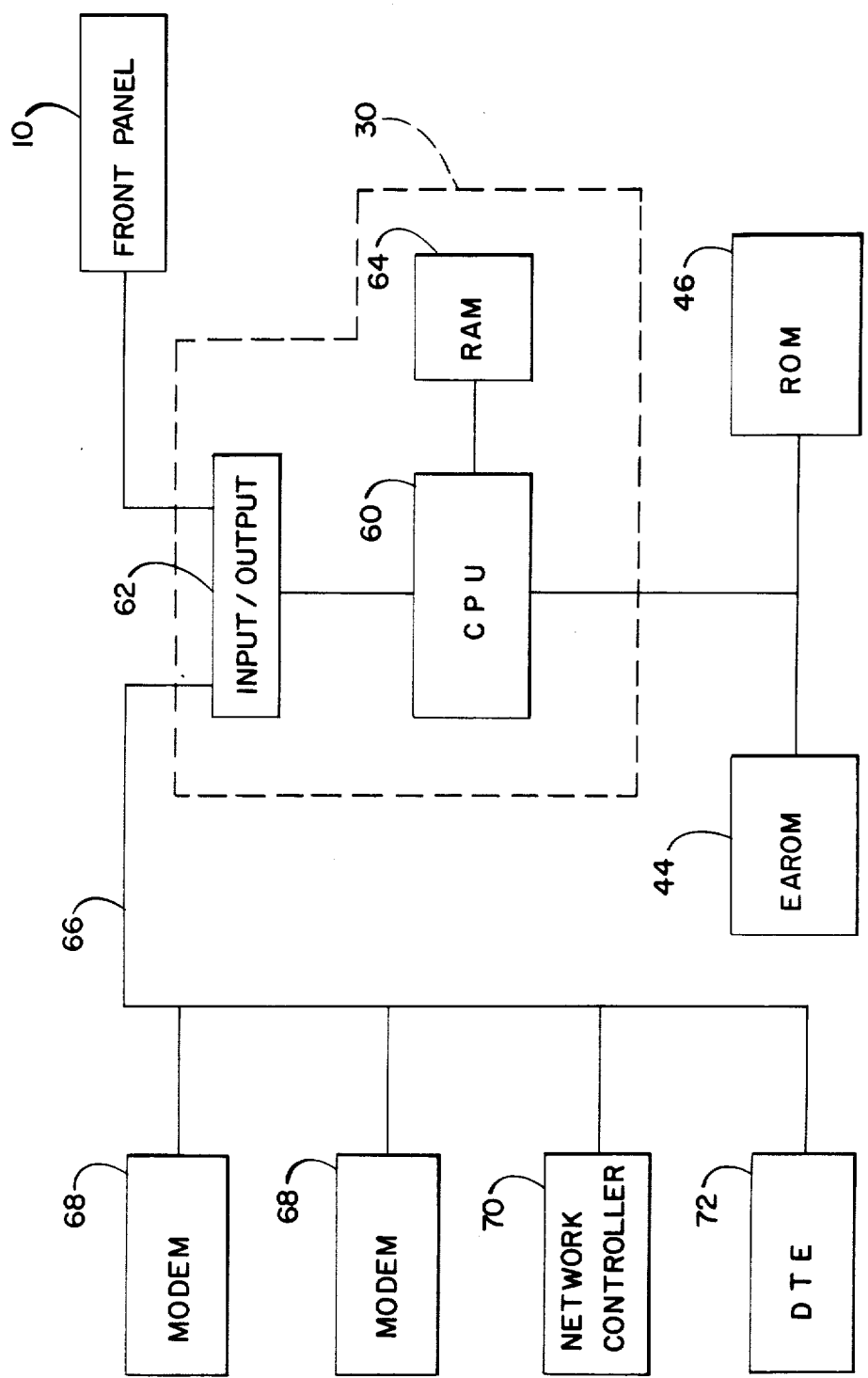
FIG. 4 shows a block diagram of an option microprocessor according to the preferred embodiment and its interface through the front panel or from remote locations.

As shown in FIG. 4, the modem option controller microprocessor 30 includes a CPU 60, an input/output interface 62 and an internal RAM 64. The CPU 60 has access to the fixed ROM 46 and the nonvolatile programmable EAROM 44 and is connected through the input/output interface 62 to the front panel 10 and a transmission link 66. On the transmission link 66 are, e.g., one or more remote modems 68, a network controller 70 and one or more data terminal equipment (DTE) units 72. Through this transmission link 66 the option controller can, e.g., monitor status, initiate testing, or set configurations in the remote modems 68, and can receive the appropriate commands for performing the same functions in the modem 12 from one of the remote modems 68, the network controller 70 or a DTE 72. In addition, certain alarm conditions in the local modem 12 are detected by the CPU 60 which is programmed to display these on display panel 18 and/or transmit them over transmission link 66 to appropriate ones of the remote modems 68, network controller 70 and/or BTE 72, for display there on the remote modem's display panel 18.

An example of the use of the front panel command pushbuttons 16 is the key mode operation. After the modem has been configured in manufacture or installation, using the software configuring according to the present invention, if it is desired to change the configuration, the option microprocessor 30 can be programmed to require entry of a "key" prior to enabling any change through the front panel 12.

For example, by pressing either the pushbutton labeled "*" or "Enter," the display panel will display "LOG - - -," with the blanks indicating digits from 0–9 or indicating, e.g., all 0's. By depressing the cursor step-down button 24 or cursor step-up button 26, the operator can set a three-digit number in the above-noted blanks on the display panel, one digit 20 at a time from right to left, across the display panel 18. The operator than depresses the "Enter" button again and the three-digit number key is compared to a key stored in the microprocessor memory. If the key number entered is correct the software locking is disabled and the operator can then employ other modes to, e.g., change configuration, or command tests. Status checks to display the modem 12 configurations and parameters can be made without entering the key. Each modem 12 could have its own unique password three-digit key to greater guard against unauthorized tampering with the transmission network.

When the "Status" button 16 is depressed on the front panel 10, the option microprocessor 30 will request from the modem controller microprocessor 41 the status of modem speed, receive level in DBM and signal quality, and the display panel 18 will be activated to display this information in the respective pair of digits on the display panel 18 so labeled in FIG. 1. The analog parameter status and test status of the modem can also be displayed by successive depression of the "Status" button 16.

Figure 5:
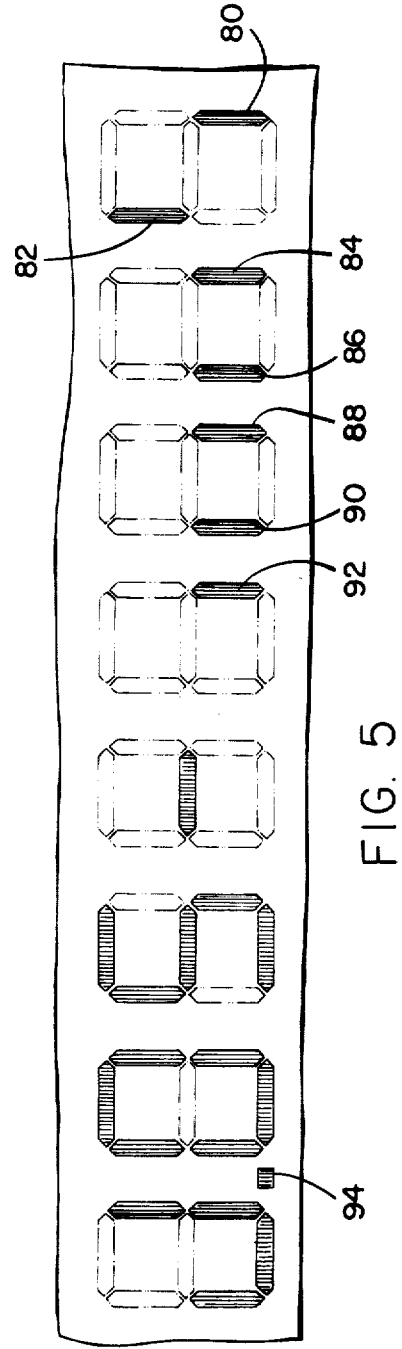
FIG. 5 shows the display panel operation according to the preferred embodiment.

When it is desired to check and/or modify the configuration, The "Config" pushbutton 16 is depressed. In response, the option microprocessor 30 will address a location in the random access memory 64 corresponding to a strap configuration designated, e.g., J01-J16. As shown in FIG. 5, the display panel 18 will be activated to display, in the left-hand three digits, the strap configuration being displayed, e.g., J05. The next digit 20 to the right of the 5 has the center horizontal segment illuminated meaning "=". The vertical segments of the remaining four digits are employed to indicate the strap status stored in memory for the appropriate strap, i.e., J5 in Table 1. Thus viewing Table 1 and FIG. 5, lower right vertical segment 80 of the right-most digit 20 on the display panel 18 indicates that the D0 binary position in the memory location for strap J5 is low. The upper left vertical segment 82 of the right-most digit 20 is illuminated, indicating that the D1 binary position in the memory location in the RAM 44 for strap J5 is high. In the same manner it can be seen that the D6-D2 binary positions 84, 86, 88, 90 and 92 are low. For the straps J1-J16 of Table 1, the left-hand lower segment of the digit 20 to the right of "=" is not illuminated because in all straps this is always set to 0, as shown by the D7 position in Table 1. Thus the present status indicated for strap J5, according to Table 1, is the transmitter training sequence corresponding to the code 000. The main RTS is in DTE controlled mode rather than constant on. The Transmitter Clock (TXC) is in preset off, rather than preset on. The transmitter clock source selected is the one corresponding to the code 10, e.g., internal clock.

Should it be desired to change the strap selected for display on display panel 18, a flashing curser dot 94 is stepped across the display panel 18, by depressing the "*" button 16, until it is in the position shown in FIG. 5 between the digit displaying the J and the digits displaying the 05. By depressing the cursor-down button 24 the digits will scroll to 04, 03, 02, 01, 16, 15, etc. Starting at 05 and depressing the cursor-up button 26 the digits will scroll 06, 07, 08 ... 16, 01, 02, etc. During this time, the display of the D6-D0 binary positions for memory location will change in accordance with the new strap memory location, which has been selected for display by scrolling the digits adjacent the J.

If it is desired to modify one or more binary digit positions D6-D0 in the selected strap memory location, it can be done by stepping the cursor dot 94 to the position to the right of the first vertical segment 92 displayed at the left-most position corresponding to D6. The cursor will begin flashing. If it is desired to change D6 in memory from low to high (0 to 1), depressing the cursor-up button 26 will load this change into a buffer register in preparation to entering into the EAROM 44 and will change the display so that the upper vertical segment at location D6 will illuminate while the lower vertical segment becomes unilluminated.

If it is desired to modify another one or more of the digits in the memory location corresponding to the selected strap, e.g., J05, the "*" button is depressed to step the flashing cursor across the display panel 18 to the location desired, e.g., the next to right-most vertical segment position 82 of the right-most digit 20, corresponding to D1. That position will indicate flashing, and, since it is high, as shown in FIG. 5, depressing the cursor-down button 24 will load that change into the buffer register and the display will indicate that the memory position has been changed from high to low. If the "Config" button 16 is depressed at this point, the display will flash the locations of the binary digits D6-D0 which have just been changed, as a final check of the proper changes having been selected prior to depressing the "Enter" pushbutton 16 to enter the new strap configuration into the appropriate location in the EAROM 44.

It can also be seen by looking at Table 1 that the modem 12 can, through the front panel 10, be configured to perform certain specified tests, and to check certain status conditions within the modem 12. In read/write command memory locations 90-94 in the EAROM 44 according to the present invention are stored binary 1's and 0's which indicate the status of the selected modem speeds. For example, 100 in binary bit locations D6-D4 for memory location 90 could indicate the modem speed selected for transmission is 4800 bps. Also as an example, 100 in the same binary bit locations for memory location 92 could indicate that the normal speed selected for Port D in a multiport modem is 4800 bps. The memory locations 95-97 contain information in binary form corresponding to certain test routines to be performed within the modem by its software modem controller 41.

The remaining buttons 16 on the front panel 10 perform various functions in a similar manner to that described above. For example, depressing the test buttons 16 will result in the display of a test menue e.g. Self Poll, Self Error, End-to-End (E.E.) Error and E.E. Poll, which can be scrolled to select the desired test menue. The test function control information is stored in the TEST 1, TEST 2 and TEST 3 memory locations of Table 1, in a RAM 64 in the option controller microprocessor 30, which can be written to or read from to conduct test routines or modify test routines. These are not stored in the EAROM 44 so that the modem can come up in a normal mode if there is a power failure.

Unit Select enables the operator at modem 12 to display a desired multidigit code for, e.g., a remote modem on the display panel, and by entering this by depressing the "Enter" button, thereby entering the digital equivalent of the three digits, up to 255, into RAM 64 in memory location RDROP. This enables communicating to that modem through the option controller microprocessor 30 and transmission link 66 to, e.g., check status, modify configuration or conduct test, by thereafter depressing the appropriate buttons 16 on the modem 12 as if those functions were being done in modem 12 as described herein.

Port select enables the operator to select a particular port in a modem 12 which is a multiport modem and display its status parameters, or change its speed or test mode, through the additional use of appropriate control buttons 16.

The Loop button 16 is for the purpose of selecting and conducting special loop type testing of the local modem 12 or a remote modem 68. The Loop test information is also stored in TEST 1, TEST 2 and TEST 3. The clear button must be depressed to take the modem 12 out of Loop test.

The Call button is used to select a desired coded message and a desired code corresponding to a particular remote modem 68 and transmit that message to that remote modem 68 over the transmission link 66. Messages may be coded, e.g., by numbers from 1–10, 11–15, with the operator at the remote site being able to tell from the number so displayed on the display panel 18 at the remote modem the meaning of the message.

Clear, once depressed, clears all, e.g., test functions or remote modem addressing which is ongoing, and returns the modem 12 to normal operation.

When a remote modem 68 is being addressed through the front panel 10 the remote light 22 is on, and when tests are being conducted with the modem 12 in a test mode, the test light 22 is on. Otherwise, with power on to the modem 12, the local local 22 is on.

As used in Table 1 the abbreviations have the following meanings. F.B1—fallback 1 (fallback speed); DL—digital loop; ET—error test; DT—dynamic test (polling); EN.ER—enable error counter; AL Loops—analog line loop; MSLP—modem side loop; LSLP—line side loop; CXR on—carrier tone on; TX in—TX controller installed; MP in—multiport installed; TPE—test pattern enable; MDSR—main modem data set ready; V54 DL—V54 compatible digital loop; R.E.B. receive elastic buffer; LR. E/A.B.—local retain enable/answer back; RX Data Clamp—receive data clamp; CTS DLY—clear to send delay; RTS con—RTS constant; EXT/INT—external or internal clock; Y4 Pattern—port on-off simulator; MPDSR—multiport data set ready; SNRA—switch network remote adapter; EIA—interface; SSEN—speed select encode; SQG—signal quality good; Lock FP—front panel lock (only status unlocked); Lock ST—lock straps (locks everything but status and test); RMC—remote modem control; TX—TX controller; MDCDON—modem data carrier detect on; MDCDSW—modem data carrier detect switched; D.P.F.O.—digital power failure output; SEC.RTS—secondary channel RTS; SEC.CDON—secondary carrier detect on; SEC.CDSW—secondary carrier detect switched; FSK.ENA—FSK enabled; FSK SW—FSK switched; D.P.F.I.—digital power failure input; ATXC Alrm—Port A transmit clock failure alarm; ARXC Alarm—Port A receive clock failure alarm. RAM memory locations 98–98F store EIAST 1-8 which is the EIA status for the ports. These are displayed in the front panel and are also accumulated over a period of 2 seconds and encoded into 8 bytes of information to be sent to the remote modem or network controller. The encoded EIA, EIAEN 1-8 (D8–8F) is written using D8–DF into the TX controller. 98–9B stores the high status of the port signals and 9C–9F stores the low status of the port signals. MTSTMD stands for modem in test mode; IDCD for internal data carrier detect; IRTS for internal request to send; ARDL for port A EIA remote digital loop input and AFB for port A fallback input from EIA (speed select for port A).

The foregoing description of the invention has been directed to a particular preferred embodiment in accordance with the requirements of the Patent Statutes and for purposes of explanation and illustration. It will be apparent, however, to those skilled in this art that many modifications and changes in both the apparatus and method of the present invention may be made without departing from the scope and spirit of the invention. For example, the particular strapping configurations, test modes and status checks stored in the ROM or RAM according to the disclosure are by way of illustration and many other variations thereof could be used with the present invention. It will be further apparent to those skilled in the art that the present invention may be utilized with suitable modifications within the skill of the art. It is the applicant's intention in the following claims to cover all such equivalent modifications and variations as fall within the true spirit and scope of the invention.

TABLE 1

MD, MP ONLY READ STRAPS FROM OC; TX READS AND WRITES.

|  | COMMAND | | STRAP NAME | D7 | D6 | D5 MODEM TABLE | D4 | D3 MP TABLE | D2 | D1 TX TABLE | D0 |
|---|---|---|---|---|---|---|---|---|---|---|---|
|  | READ | WRITE | | | | | | | | | |
| COMMON | 80 | C0 | J1 | 0 | | | | PT1 | PT0 XMT GAIN | TT1 | TT0 |
| MD | 81 | C1 | J2 | 0 | MT2 M.P. | MT1 REMOTE | MT0 DITHER | TXG3 | TXG2 RX GAIN | TXG1 LOOPGAIN | TXG0 |
|  | 82 | C2 | J3 | 0 | P.P. V54 DL | CENTRAL MDSR | TONE DSR IN | RXG1 R.E.B. | RXG0 $\overline{HOLD}$ | LPG1 LR.E./ | LPG0 RXDATA |
|  | 83 | C3 | J4 | 0 | LOCAL | CON/$\overline{DCE}$ RX TRAINING SEQ. | LOOP | EN MRTS ON | $\overline{OVER}$ PRSET | A.B. XMIT TX CLOCK SOURCES | CLAMP |
|  | 84 | C4 | J5 | 0 | RS2 XMIT TRAINING SEQ. | RS1 | RS0 | MRTS SW | TXC MODEM CLK SOURCE | TXCS1 CLK | TXCS0 EXT/$\overline{INT}$ |
| MD | 85 | C5 | J6 | 0 | TS2 | TS1 CTS DLY | TS0 RTS CON | A | MCKS1 | MCKS0 | |
|  |  |  |  |  |  |  |  |  | CTS DLY | RTS CON | |
|  | 86 | C6 | J7 | 0 | 0 | C CLK | C EXT/$\overline{INT}$ | B CTS DLY | B RTSCON | RX A CLK | TX A EXT/$\overline{INT}$ |
|  | 87 | C7 | J8 | 0 | 0 | RX C | TX C | D CTS DLY | D RTSCON | RX B CLK | TX B EXT/$\overline{INT}$ |
| MP | 88 | C8 | J9 | 0 | 0 | Y4 PATTERN | A | D TRANSMIT | D Y4 | B IN/$\overline{OUT}$ | TX D |
|  | 89 | C9 | J10 | 0 | P2 MASTER | P1 MPDSR | P0 SNRA | D RECEIVE | C Y4 | B IN/$\overline{OUT}$ | A |
|  |  |  |  |  |  | CON/$\overline{DCE}$ VARIABLE PORT | IN/$\overline{OUT}$ | D | C DYNAPORT ENABLE | B | A |
|  | 8A | CA | J11 | 0 | SLAVE PORT CONTROL | VP1 EIA | VP0 RDL/ | D | C DATA INVERT NORMAL | B | A |
|  |  |  |  |  | DTR/$\overline{RTS}$ | | | | | | |

TABLE 1-continued

| | | SQG<br>RMC/ | SSEN<br>LOCK | X<br>LOCK | D<br>POWER FAIL<br>DETECTOR | C | B<br>DIGITAL RCVR<br>REPLY PATH | A |
|---|---|---|---|---|---|---|---|---|
| 8B | CB | | | | | | | |
| 8C | CC | | | FP | | | CONTROL<br>ANALOG RCVR<br>REPLY PATH | |
| 8D | CD | TX<br>D.P.F.O./<br>MDCDON/ | ST<br>MDCDON/ | X | | | CONTROL<br>RECONFIG.<br>EXECUTION | |
| 8E | CE | SEC.RTS<br>RECONFIG | MDCDSW<br>SEC.CDON | X | | | CONTROL<br>COMMAND<br>EXECUTION | |
| 8F | CF | NORMAL<br>D.P.F.I./ | SEC.CDSW<br>FSK ENA | X | | | CONTROL<br>ANALOG RCVR.<br>REGEN. | |
| | | SEC. CD | FSK SW | | | | CONTROL<br>DIGITAL RCVR<br>REGEN.<br>CONTROL | |
| | | | | | | | CONTROL<br>MAYDAY<br>DIRECTION<br>CONTROL | |

BOTH M.P. AND T.X. READS AND WRITES LOCAL SPEED AND TEST CONTROL.

| COMMAND | | | | | | REPLY | | | | |
|---|---|---|---|---|---|---|---|---|---|---|
| READ | WRITE | NAME | D7 | D6 | D5 | D4 | D3 | D2 | D1 | D0 |
| 90 | D0 | SPEED 1 | 0 | 48 | MODEM SPEED TX | 0 | REFRESH | 48 | MODEM SPEED RX | 0 |
| 91 | D1 | SPEED 2 | 0 | 48 | PORT B NORMAL<br>24 | 12 | 0 | 48 | PORT A NORMAL<br>24 | 12 |
| 92 | D2 | SPEED 3 | 0 | 48 | PORT D NORMAL<br>24 | 12 | 0 | 48 | PORT C NORMAL<br>24 | 12 |
| 93 | D3 | SPEED 4 | 0 | 0 | PORT B F.BI<br>24 | 12 | 0 | 0 | PORT A F.BI<br>24 | 12 |
| 94 | D4 | SPEED 5 | 0 | 0 | PORT D F.BI<br>24 | 12 | 0 | 0 | PORT C F.BI<br>24 | 12 |
| 95 | D5 | TEST 1 | 0 | REMOTE | ANY<br>TEST<br>ON | CALL | DL | ET | DT | TIMER | DL, ET DT<br>CALL<br>OTHERWISE |
| 96 | D6 | TEST 2 | 0 | LOCAL<br>EN.ER<br>CTR | AL LOOPS<br>MSLP<br>(L3)<br>MPIN | LSLP<br>(L4)<br>RETRAIN | D<br>CA3<br>CXR ON<br>TPE | C<br>CA2<br>X<br>SQUELCH<br>ON | B<br>CA1<br>X | A<br>CA0<br>X<br>X |
| 97 | D7 | TEST 3 | 0 | TXIN<br>T1 | | | T1 | | COMMANDS | |

O.C. REQUESTS LOCAL AND REMOTE EIA STATUS FROM M.P. AND R.M.C.

| COMMAND | | | | | | REPLY | | | | |
|---|---|---|---|---|---|---|---|---|---|---|
| READ | WRITE | NAME | D7 | D6 | D5 | D4 | D3 | D2 | D1 | D0 |
| 98 | | EIAST1 | 0 | A<br>TXC<br>ALARM | DSR | RTS | CTS | TXD<br>PORT B | DCD | RXD |
| 99 | | EIAST2 | 0 | | DSR | | | | | |
| 9A<br>9B | | EIAST3<br>EIAST4 | 0<br>0 | | DSR<br>DSR | | | PORT C | | |
| 9C | | EIAST5 | 0 | A<br>RXC<br>ALARM | $\overline{DSR}$ | $\overline{RTS}$ | $\overline{CTS}$ | $\overline{TXD}$<br>PORT A HI<br>PORT D HI<br>PORT A LOW | $\overline{DCD}$ | $\overline{RXD}$ |

TABLE 1-continued

| COMMAND READ | | NAME | D7 | D6 | D5 | D4 | D3 | D2 | D1 | D0 |
|---|---|---|---|---|---|---|---|---|---|---|
| 9D | | EIAST6 | 0 | | DSR | | PORT B | LOW | | |
| 9E | | EIAST7 | 0 | | DSR | | PORT C | LOW | | |
| 9F | | EIAST8 | 0 | | DSR | | PORT D | LOW | | |

STATUS READ REQUESTS AND SPECIAL REQUESTS.

| COMMAND READ | WRITE | NAME | D7 | D6 | D5 | D4 | D3 | D2 | D1 | D0 |
|---|---|---|---|---|---|---|---|---|---|---|
| A0 | E0 | EIASIG | 0 | MDSR | MSQG | MTSTMD | D | C | B | A |
| | | | | | | | | ACTIVE PORTS | | |
| A1 | | MDSTA1 | 0 | IDCD | 0 | RL4 | RL3 | RL2 | RL1 | RL0 |
| | | | | | | | RECEIVE LINE LEVEL | | | |
| A2 | | MDSTA2 | 0 | IRTS | ARDL | AFB | SQ3 | SQ2 | SQ1 | SQ0 |
| | | | | | | ERROR COUNT LSB/POLL ERROR | SIGNAL QUALITY | | | |
| A3 | | ERCNT1 POLLER | 0 | ER16 | ER15 | ER14 | ER13 | ER12 | ER11 | ER10 |
| A4 | | ERCNT2 POLL NO. | 0 | ER26 | ER25 | ER24 | ER23 | ER22 | ER21 | ER20 |
| | | | | | | ERROR COUNT M.S.B./NUMBER OF POLLS | | | | |
| A5 | E5 | SPEED 6 | 0 | PORT B | | DYNAPORT SPEED | 0 | | | |
| A6 | E6 | SPEED 7 | 0 | PORT D | | DYNAPORT SPEED | 0 | | | |
| A7 | E7 | RDROP | 0 | X | X | REMOTE DROP ADDRESS X | X | X | X | X |

SPECIAL REQUESTS.

| COMMAND READ | WRITE | NAME | D7 | D6 | D5 | D4 | D3 | D2 | D1 | D0 |
|---|---|---|---|---|---|---|---|---|---|---|
| A8 | | APREQ | | | | SPECIAL REQUESTS ANALOG PARAMETER COMMAND | | | | |
| A9 | E9 | T7ADDR | | | | T7 ADDRESS REQUEST ACKNOWLEDGE | | | | |
| AA | | SYNCMD | | | | SYNC REPLY | | | | |
| AB | | NOREQ | | | | NO REPLY AVAILABLE | | | | |
| AC | EC | CONTINUE | | | | NEXT DATA | | | | |
| AD | | SERNOR | | | | SERIAL # REQUEST ACKNOWLEDGE | | | | |
| AE | | TXDATA | X | TX1 | TX0 | TRANSMIT DATA FROM MP | | X | X | X |
| AF | | TXDTAR | X | | | COGBIT | COGEN | X | X | X |

SPECIAL REPLIES (16 AVAILABLE - ONLY 4 USED NOW)

| COMMAND | REPLY NAME | D7 | D6 | D5 | D4 | D3 | D2 | D1 | D0 |
|---|---|---|---|---|---|---|---|---|---|
| B1 | WRTACK | 1 | 0 | 1 | 1 | 0 | 0 | 0 | 1 |
| B2 | SPARE | 1 | 0 | 1 | 1 | 0 | 0 | 1 | 0 |
| B3 | SPARE | 1 | 0 | 1 | 1 | 0 | 0 | 1 | 1 |
| B4 | WAITREP | 1 | 0 | 1 | 1 | 0 | 1 | 0 | 0 |
| B5 | SPARE | 1 | 0 | 1 | 1 | 0 | 1 | 0 | 1 |
| B6 | SYNACK | 1 | 0 | 1 | 1 | 0 | 1 | 1 | 0 |

TABLE 1-continued

| B7 | NOREP | D7 | D6 | D5 | D4 | D3 | D2 | D1 | D0 |
|---|---|---|---|---|---|---|---|---|---|
| COMMAND WRITE | NAME | | | | ENCODED PORT DATA WRITE TO TX (FROM O.C. OR M.P.) | | | | |
| D8 | EIAEN1 | 0 | TXC ALARM | X | COINCIDE BIT | PORT A ENCODE 1 RTS | RE0 | TE1 | TE0 |
| | | | | | | RE1 PORT B EN1 | | | |
| D9 | EIAEN2 | 0 | | | | PORT C EN1 | | | |
| DA | EIAEN3 | 0 | | | | PORT D EN1 | | | |
| DB | EIAEN4 | 0 | | | | | | | |
| DC | EIAEN5 | 0 | RXC ALARM | PORT ACTIVE | DSR | PORT A ENCODE 2 DCD DE1 PORT B EN2 | DE0 | RX E1 | RX E0 |
| DD | EIAEN6 | 0 | | | | PORT C EN2 | | | |
| DE | EIAEN7 | 0 | | | | PORT D EN2 | | | |
| DF | EIAEN8 | 0 | | | | | | | |
| | | | EIA SIG. AND EIA CMD BETWEEN OC AND MP. | | | | | | |
| COMMAND READ | NAME | D7 | D6 | D5 | D4 | D3 | D2 ACTIVE PORTS | D1 | D0 |
| E0 E6 | EIASIG | | MDSR | MSQG RDL | MTSTMD | D | C | B | A |
| D8 | EIACMD | 0 | D | C | B | 0 | D | C | B |
| | | | TX REQUESTS ANALOG PARAMETERS FROM MCU THROUGH M.C. REPLY | | | | | | |
| COMMAND READ | NAME | D7 | D6 | D5 | D4 | D3 | D2 | D1 | D0 |
| 0-7E | RTAPXX | 0 | | | | EQUALIZER TAP SETTING REAL | | | |
| (EVEN) 1-7F (ODD) | ITAPXX | 0 | | | | EQUALIZER TAP SETTING IMAGINARY | | | |
| B0 | | 0 | | | | RADIAL ERROR | | | |
| B4 | | 0 | | | | TANGENTIAL ERROR | | | |
| B8 | | 0 | | | | CLOCK SLEW | | | |
| BC | | 0 | | | | FREQUENCY TRANSLATION | | | |
| C0 | | 0 | | | | PHASE JITTER | | | |
| C4 | | 0 | | | | PHASE HITS | | | |
| C8 | | 0 | | | | AMPLITUDE | | | |
| | | | MODEM CONTROLLER WRITES TO M.P. RECEIVE DATA. REPLY (RDATA FORMAT) | | | | | | |

TABLE 1-continued

| COMMAND INPUT | NAME | D7 | D6 | D5 | D4 | D3 | D2 | D1 | D0 |
|---|---|---|---|---|---|---|---|---|---|
| RX DATA EO-FF | RXDATA | 1 | 1 | 1 | RCOG | 0 | RX2 | RX1 | RX0 |

What is claimed is:

1. A data modem, comprising:

an option microprocessor for use in establishing a configuration of said modem;

input means, coupled to said option microprocessor and and coupled to a control panel for receiving input signals from said control panel and for providing said input signals to said option microprocessor;

a nonvolatile alterable memory, coupled to said option microprocessor, for storing information for use by said option microprocessor in establishing a custom modem configuration;

a fixed read only memory, coupled to said option processor, for permanently storing information for use by said option microprocessor in establishing a default modem configuration;

a first random access memory coupled to said option microprocessor for storing one of said modem configurations;

loading means, coupled to said option microprocessor and responsive to said input means, for loading information stored in one of said fixed read only memory and said nonvolatile alterable memory into said random access memory to establish information in said first random access memory to define said modem configuration, said loading means including means for first attempting to load said custom configuration information from said nonvolatile memory and in the absence of configuration information in said nonvolatile memory for attempting to load said default modem configuration information from said fixed read only memory;

keying means, coupled to said input means, for receiving a key code and comparing said key code to a predetermined code prior to accepting input from said control panel, and further including means for inhibiting said loading means from accepting input from said control panel if said key code is different than said predetermined code;

modem configuring means, coupled to said random access memory, for configuring said modem in response to information stored in said random access memory;

a second random access memory;

a plurality of control microprocessors for controlling a corresponding plurality of modem functions, each of said control microprocessors coupled to said second random access memory;

means for transferring portions of said modem configuration information from said first random access memory to said second random access memory for use by said plurality of control microprocessors; and display means situated on an outer surface of said modem, for displaying information indicative of the configuration of said modem.

2. The data modem of claim 1, wherein said input means includes a plurality of manually operable controls disposed on an outer surface of said modem.

* * * * *